United States Patent
Gutmann et al.

(10) Patent No.: US 11,223,164 B2
(45) Date of Patent: Jan. 11, 2022

(54) PLUG-IN MODULE FOR A SENSOR AND METHOD OF INSTALLING A PLUG-IN MODULE FOR A SENSOR

(71) Applicant: SICK AG, Waldkirch (DE)

(72) Inventors: Frank Gutmann, Waldkirch (DE); Wolfgang Marschner, Waldkirch (DE); Dominik Paul, Waldkirch (DE)

(73) Assignee: SICK AG, Waldkirch (DE)

( * ) Notice: Subject to any disclaimer, the term of this patent is extended or adjusted under 35 U.S.C. 154(b) by 953 days.

(21) Appl. No.: 15/054,459

(22) Filed: Feb. 26, 2016

(65) Prior Publication Data
US 2016/0268737 A1   Sep. 15, 2016

(30) Foreign Application Priority Data

Mar. 11, 2015   (DE) .......................... 102015103551.0

(51) Int. Cl.
| | |
|---|---|
| *H01R 13/645* | (2006.01) |
| *G01D 11/24* | (2006.01) |
| *H01R 13/52* | (2006.01) |
| *H01R 13/66* | (2006.01) |
| *H01R 13/642* | (2006.01) |
| *H01R 13/64* | (2006.01) |

(52) U.S. Cl.
CPC ......... *H01R 13/645* (2013.01); *G01D 11/245* (2013.01); *H01R 13/521* (2013.01); *H01R 13/64* (2013.01); *H01R 13/642* (2013.01); *H01R 13/665* (2013.01); *H01R 13/6658* (2013.01)

(58) Field of Classification Search
CPC .. G01D 11/245; H01R 13/521; H01R 13/642; H01R 13/645; H01R 13/665; H01R 13/6658; A61B 2562/227
See application file for complete search history.

(56) References Cited

U.S. PATENT DOCUMENTS

| | | | | |
|---|---|---|---|---|
| 4,497,198 | A | * | 2/1985 | Takahashi ............. G01L 23/222 73/35.11 |
| 5,789,920 | A | * | 8/1998 | Gass ....................... B29C 70/84 324/207.15 |

(Continued)

FOREIGN PATENT DOCUMENTS

| | | |
|---|---|---|
| DE | 195 12 915 C1 | 8/1996 |
| DE | 19546865 C1 | 10/1996 |

(Continued)

OTHER PUBLICATIONS

Search report issued in German application No. 10 2015 103 551.0 dated Dec. 2, 2015.

*Primary Examiner* — Christian Jang
*Assistant Examiner* — Karen E Toth
(74) *Attorney, Agent, or Firm* — Nath, Goldberg & Meyer; Jerald L. Meyer

(57) ABSTRACT

The invention relates to a plug-in module for a sensor (32) comprising a sleeve-like housing (3) in which a sensor element (27), a carrier board (16) carrying an electronic circuit and a plug-in unit (2) are positioned. In a plug-in module which can be used equally for sensors of different sizes, an outer diameter (5) of the plug-in unit (2) approximately corresponds to a smallest inner diameter (8) of the sleeve-like housing (3), wherein a coding sleeve (4) is inserted between the plug-in unit (2) and the sleeve-like housing (3).

12 Claims, 4 Drawing Sheets

(56) References Cited

U.S. PATENT DOCUMENTS

Figure 1:
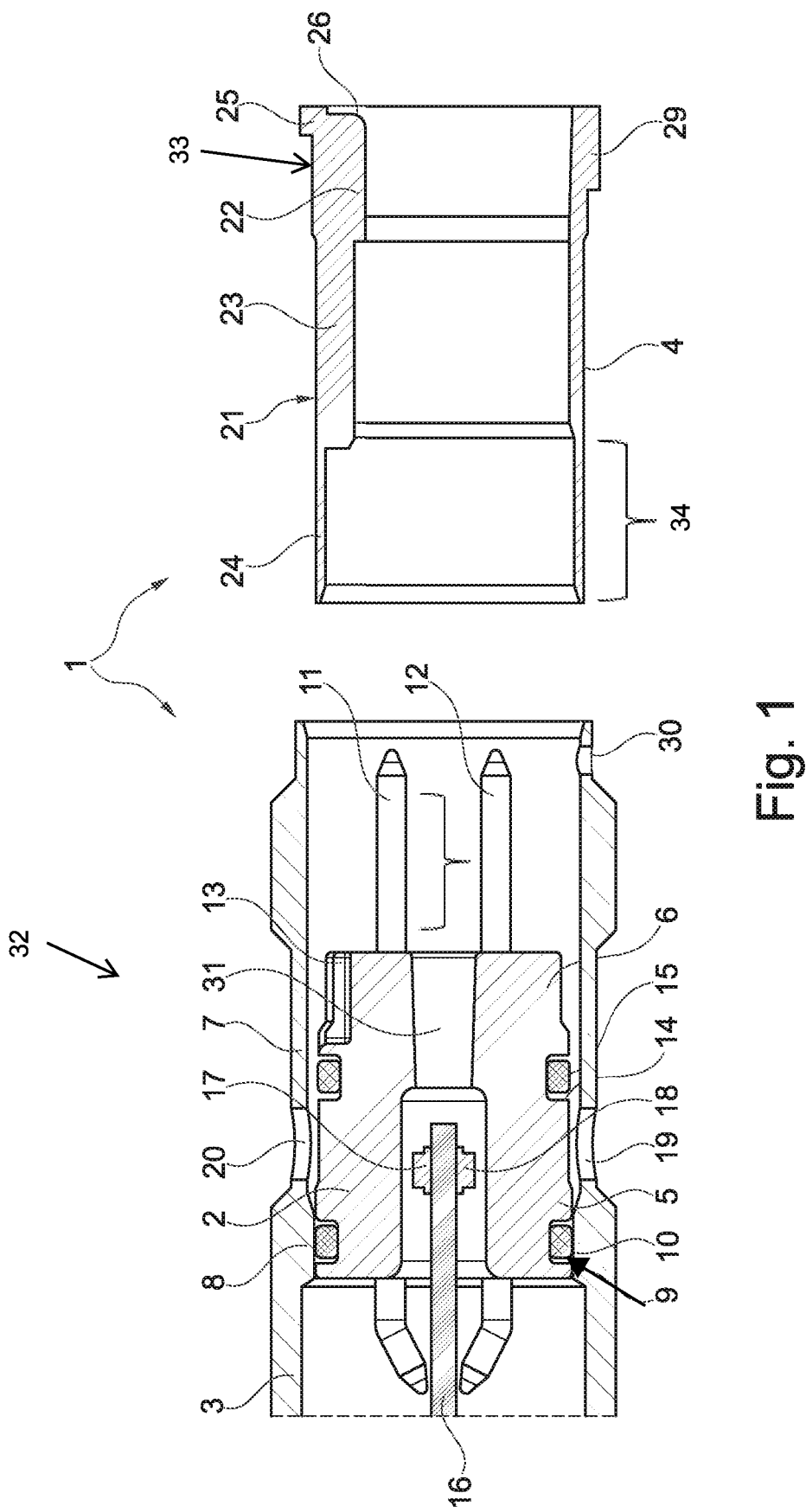

| | | | |
|---|---|---|---|
| 6,906,527 B1 | 6/2005 | Niimi et al. | |
| 2005/0048848 A1* | 3/2005 | Axenbock | H01R 13/2421 |
| | | | 439/700 |
| 2006/0205251 A1* | 9/2006 | Gaidosch | H01R 9/031 |
| | | | 439/95 |
| 2010/0112866 A1* | 5/2010 | Friedhof | H01R 13/6633 |
| | | | 439/620.22 |
| 2014/0117979 A1* | 5/2014 | Heimlicher | H03K 17/9505 |
| | | | 324/207.16 |

FOREIGN PATENT DOCUMENTS

| | | |
|---|---|---|
| DE | 198 22 354 A1 | 12/1999 |
| DE | 10237904 A1 | 1/2004 |
| DE | 103 59 885 B4 | 5/2006 |
| EP | 2034277 A1 | 3/2009 |

* cited by examiner

PLUG-IN MODULE FOR A SENSOR AND METHOD OF INSTALLING A PLUG-IN MODULE FOR A SENSOR

The invention relates to a plug-in module for a sensor comprising a sleeve-like housing in which a sensor element, a carrier board carrying an electronic circuit and a plug-in unit are positioned and to a method of installing a plug-in module for a sensor in which a pre-installed assembly comprising a plug-in unit, a carrier board carrying an electronic circuit and a sensor element is introduced into a sleeve-like housing either from one side or from the other side.

Electronic sensors are used in a variety of ways in industrial use for the detection and monitoring of specific work routines. There are a plurality of different sensors which differ in their measurement operation, their design and their size in dependence on their area of application. Contactlessly operating sensors such as inductive proximity switches are thus known which monitor a specific zone or which detect the position of an object. As a rule, plug-in units which are formed in one part are used in these inductive proximity switches.

Disadvantages which are very cost-intensive in particular result when sensor elements of different sizes are to be installed. It may be necessary in this respect in dependence on the embodiment that the housing sleeves are implemented in a two-part design, which results in higher costs.

A method of manufacturing a switching device as well as an assembly for a switching device are known from DE 103 59 885 B4 in which the assembly is formed by a sensor unit, a carrier element for an electronic circuit and a connection part configured as a plug-in unit. This assembly is prefabricated and is introduced into a housing sleeve in the assembled state. The assembly can in this respect, on the one hand, be introduced into the housing sleeve via a measurement side. There is, however, also the possibility of introducing the assembly via a rear end of the housing sleeve in said rear end. There is, however, the disadvantage in this respect that different shapes of the housing, of the sensor element and of the connection part become necessary for the introduction of the assembly via the rear end of the housing sleeve, which has the consequence of additional manufacturing costs. The connection part formed as a plug-in unit is in this respect outwardly seated on the housing sleeve and seals its inner space toward the environment.

It is the object of the invention to provide a plug-in module for a sensor and a method of installing the plug-in module for a sensor in which the prefabricated assembly can be introduced into the housing sleeve both from the one side and from the other side with a minimal construction effort and/or cost.

The object is respectively satisfied by a plug-in module for a sensor and by a method of installing the plug-in module for a sensor.

The object is satisfied in accordance with the invention in that an outer diameter of the plug-in unit approximately corresponds to a smallest inner diameter of the sleeve-like housing, with a coding sleeve being inserted between the plug-in unit and the sleeve-like housing. A reliable positioning or centering of the plug-in unit in the housing takes place due to the approximately equal diameters of the inner diameter of the sleeve-like housing and of the outer diameter of the plug-in unit, wherein the housing can be equipped both from the one side and from the other side depending on the size of the sensor element. The coding sleeve in this respect makes possible a fixed alignment of the plug-in unit with respect to a mating plug to be introduced into this plug-in unit and simultaneously makes possible a fixing of the plug-in unit. A universally usable plug-in module for different sensors is thus provided.

In an embodiment, the sleeve-like housing and the coding sleeve and/or the coding sleeve and the plug-in unit are connected to one another in a force-transmitting and/or shape-matched manner. The shape match between the coding sleeve and the housing in this respect simultaneously serves for the taking up of torque on the insertion of a mating plug. The same advantage is achieved by the press connection between the coding sleeve and the housing, whereby a fixing to one another is simultaneously possible. The housing and the coding sleeve are in this respect at least partly pressed together. Only two method steps are necessary in the installation process due to this design. The advantageous shape-matched connection between the coding sleeve and the plug-in unit is of particular advantage for the further electric contact of the plug-in unit or of the mating plug.

In a further development of the invention, the sleeve-like housing and the coding sleeve and/or the coding sleeve and the plug-in unit are connected to one another with shape matching at least tangentially in the peripheral direction of the coding sleeve. The tangential shape match between the coding sleeve and the housing in this respect simultaneously serves for the taking up of torque on the insertion of a mating plug.

In a further embodiment, the plug-in unit has at least two different outer diameters and/or the sleeve-like housing has at least two different inner diameters, wherein the largest outer diameter of the plug-in unit contacts the smallest inner diameter of the sleeve-like housing. Different sleeve-like housings can be manufactured for sensor elements of different sizes. At the same time, a reliable fixing of the sensor element in the sleeve-like housing is ensured by the positioning of the coding sleeve between the sleeve-like housing and the plug-in unit.

The smallest inner diameter of the sleeve-like housing advantageously forms a sealing surface which a first seal arranged at the plug-in unit contacts. Not only a contacting of the sleeve-like housing at the plug-in unit is thereby ensured, but simultaneously the sealing of the sleeve-like housing toward the environment is also ensured. A sealing of the inner sensor space is thereby ensured.

In a further embodiment, two peripheral grooves for receiving a respective first or second seal are formed along the at least one outer diameter of the plug-in unit, wherein the second seal is formed opposite the coding sleeve which forms a second sealing surface for the second seal. The housing is reliably sealed with respect to moisture in the plug space by this second seal.

In a further development of the invention, the coding sleeve which approximately completely surrounds the plug-in unit and which is surrounded by the sleeve-like housing has a local coding element.

In a variant, the coding sleeve which approximately completely surrounds the plug-in unit and which is surrounded by the sleeve-like housing has a local coding element which is axially formed in step-shape, with the steps tapering in the direction of the plug-in unit. The plug-in unit is fixed in the coding sleeve with shape matching by this design.

In an embodiment, the coding sleeve has an integrated coding rib for aligning a mating plug at its end opposite the plug-in unit. It is thus ensured that a mating plug to be introduced into the plug-in module always adopts the correct electrical connection to the plug-in unit.

In order always to ensure the correct pin assignment of the plug-in unit, the plug-in unit has a locally formed coding notch at at least the smaller outer diameter.

In an embodiment, the sensor element, the carrier board carrying an electronic circuit and the plug-in unit form an electrically and mechanically fixedly connected pre-assembly which can be installed particularly simply in the sleeve-like housing. The spacings between the sensor element, the electronic circuit and the plug-in unit are maintained by this pre-assembly so that they easily fill the inner space of the sleeve-like housing.

In a further embodiment, a section of the coding sleeve covers an LED bore from the inside, with the LED bore being formed in the sleeve-like housing. This has the advantage that hollow spaces in the inner space of the sleeve-like housing are reduced and a displacement of the pre-assembly is thus inhibited.

The LED bore is advantageously arranged between the two seals surrounding the plug-in unit. This has the advantage that the LED bore which represents a connection of the plug-in module to the environment is reliably enclosed by sealing elements so that the penetration of moisture and contaminants into the plug-in module is inhibited.

In an alternative, the two seals surrounding the plug-in unit are positioned at a side of the LED bore, with the side facing the sensor element.

In a further embodiment, the plug-in unit has an axial passage bore for filling with a compound. By filling a compound into the plug-in module, the pre-assembly comprising the sensor element, the carrier board carrying the electronic circuit and the plug-in unit is fixedly locked in its location so that a releasing of electrical connections is inhibited. At the same time, the penetration of moisture is inhibited.

A further development of the invention relates to a method of installing a plug-in module for a sensor in which a pre-installed assembly comprising a plug-in unit, a circuit board carrying an electronic circuit and a sensor element is introduced into a sleeve-like housing either from one side or from the other side. In a method in which the pre-installed assembly is to be introduced into the sleeve-like housing both from the one side and in the other side with a minimal construction effort and/or cost, the pre-installed assembly is displaced in the sleeve-like assembly for so long until a smallest inner diameter of the sleeve-like housing is seated on the largest outer diameter of the plug-in unit, wherein the plug-in unit is subsequently fixed by a coding sleeve introduced into the sleeve-like housing opposite to the carrier board. This has the advantage that the actual installation direction is determined solely by the construction size of the sensor or by the construction size of the sensor element. The diameter of the housing is the smallest and the outer diameter of the plug-in unit is the largest in the region of the sealing point of the housing to the plug-in unit seated in front of the LED bore, whereby the plug-in unit can in principle be installed from both sides. The high forces for pressing the coding sleeve into the sleeve-like housing are in this respect only transmitted to a small extent to the carrier board carrying the electronic circuit and to the sensor element and correspond to the installation forces of the seals which are thus not critical.

The plug-in unit is advantageously subsequently fixed in position tangentially in the peripheral direction by the coding sleeve introduced into the sleeve-like housing opposite to the circuit board.

The coding sleeve is advantageously pressed with the sleeve-like housing. A reliable connection between the coding sleeve and the sleeve-like housing is possible due to this force-transmitting fixing.

The invention allows a number of embodiments. One of them will be explained in more detail with reference to the Figures shown in the drawing.

Figure 2:
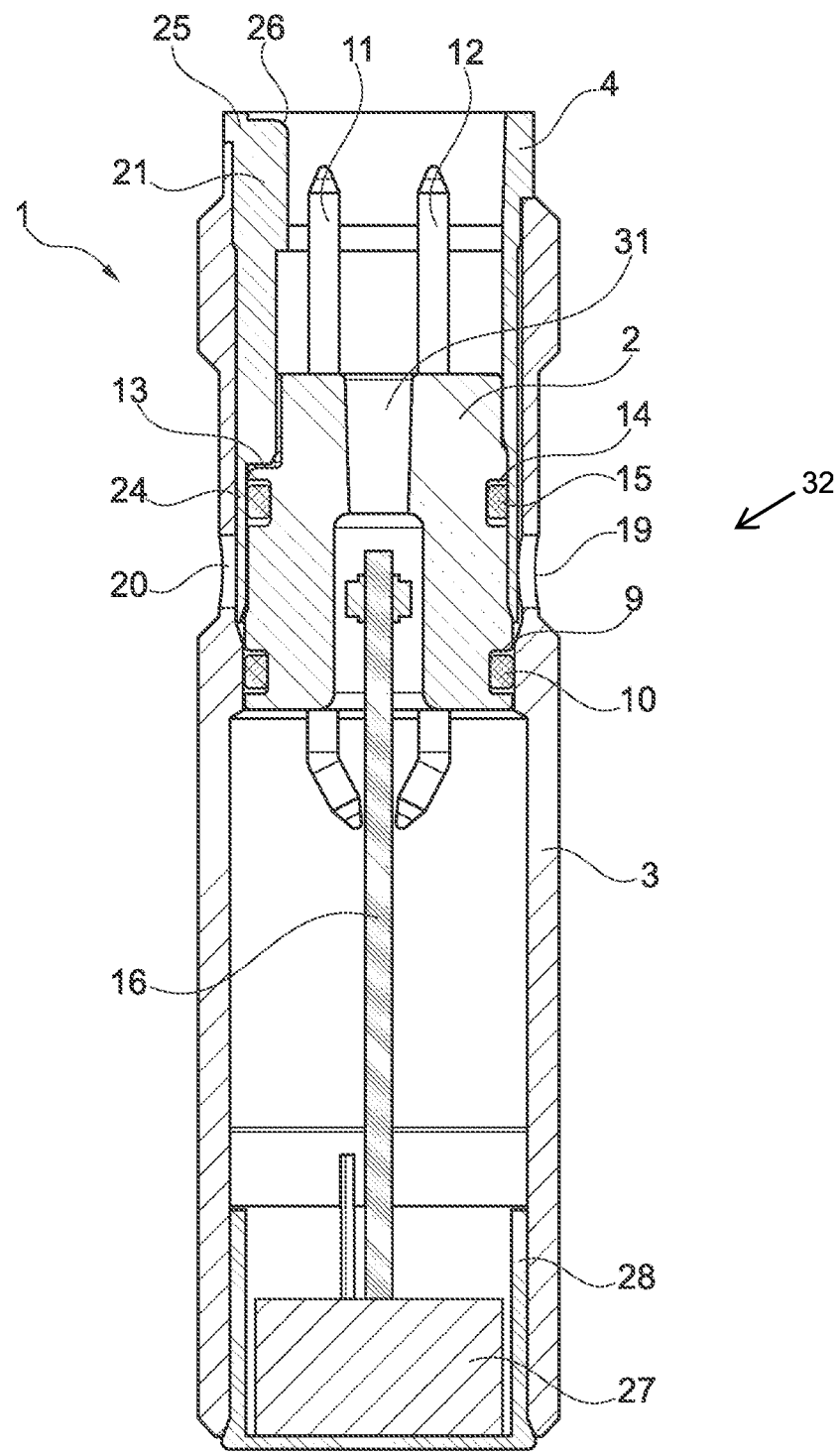
Figure 3:
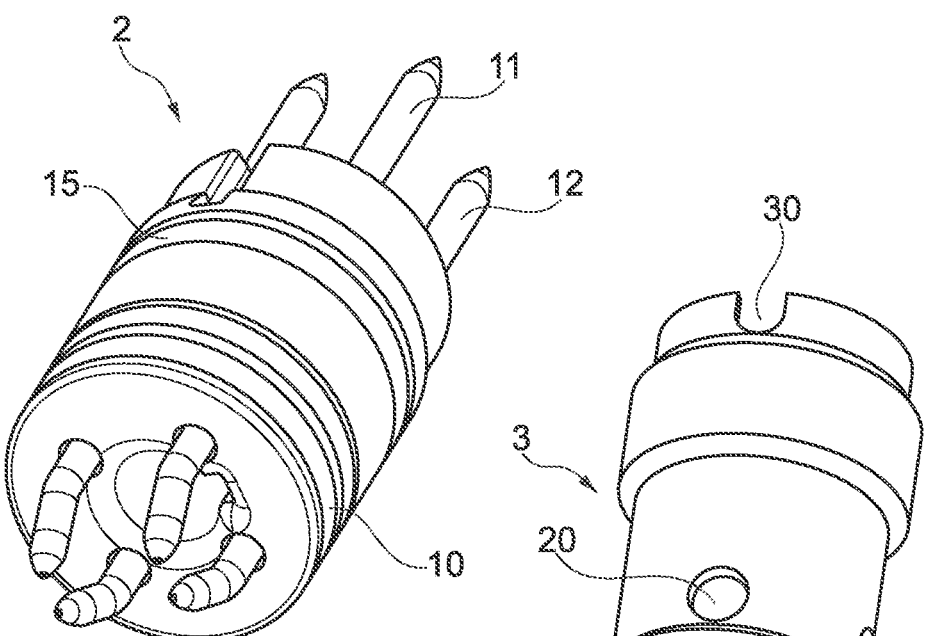
Figure 4:
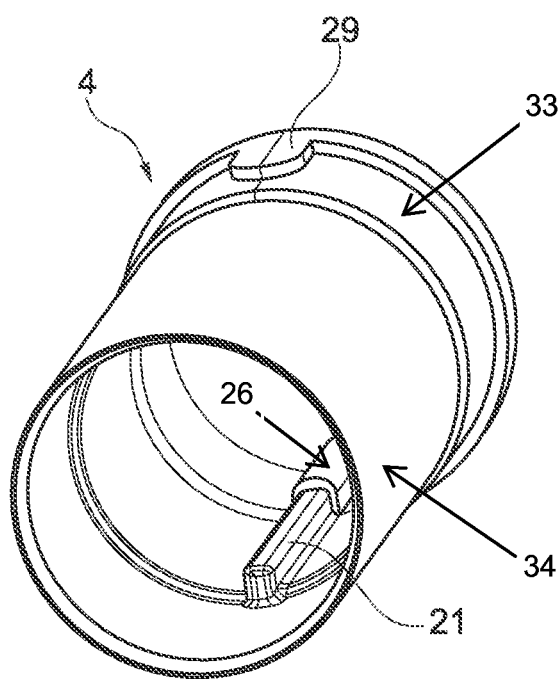
Figure 5:
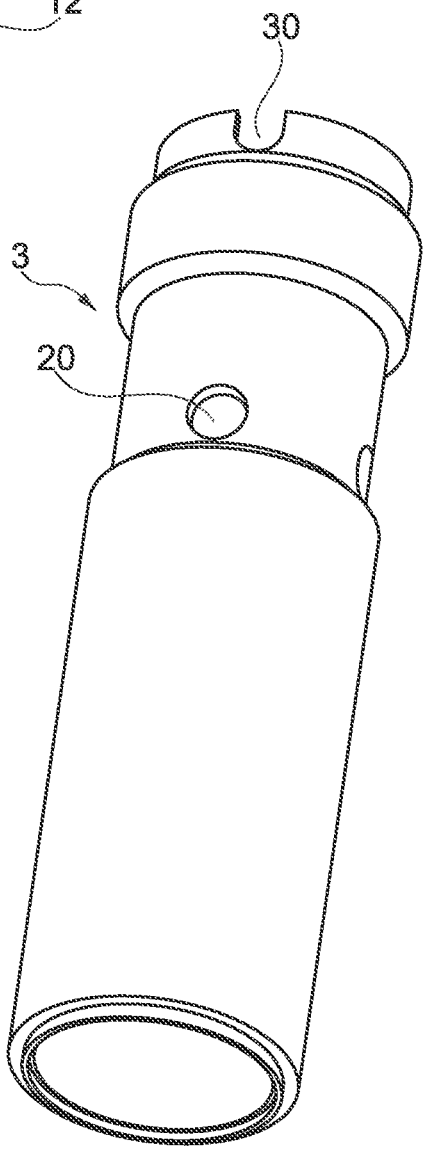
Figure 6:
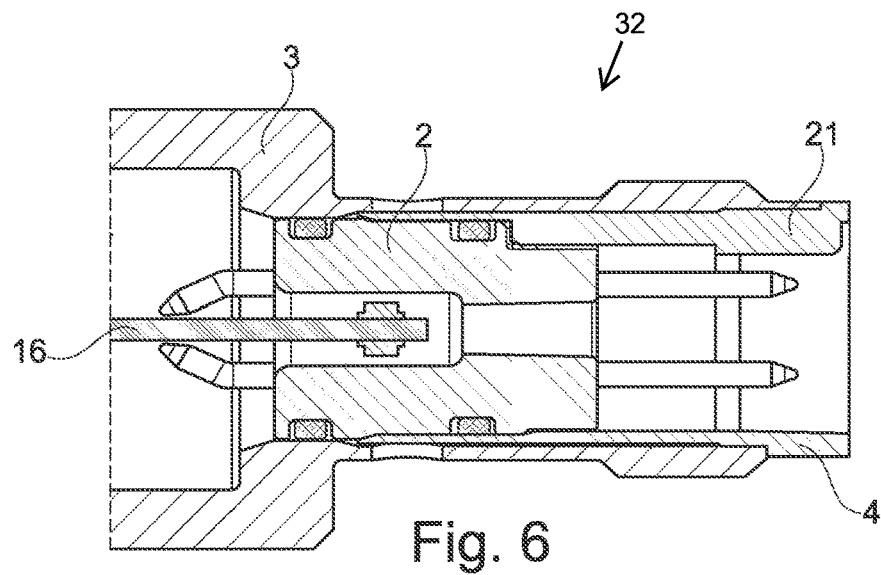
Figure 7:
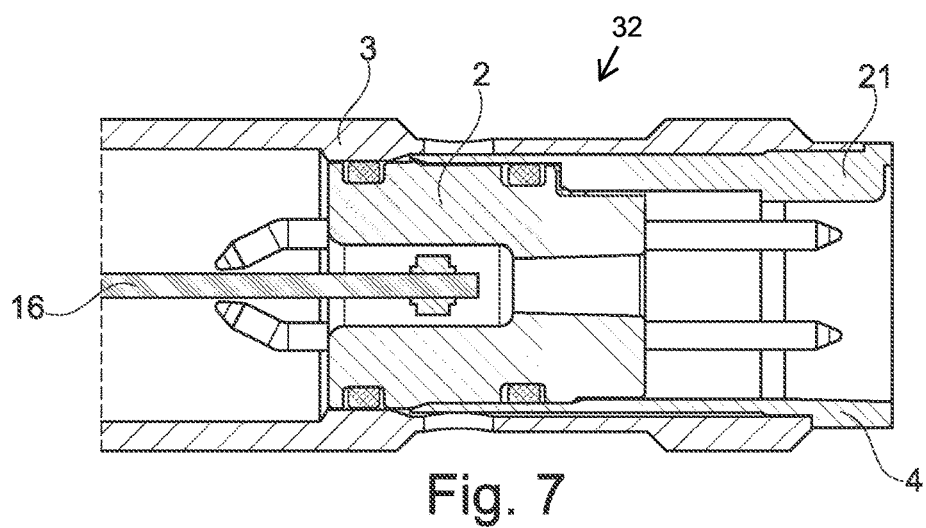
Figure 8:
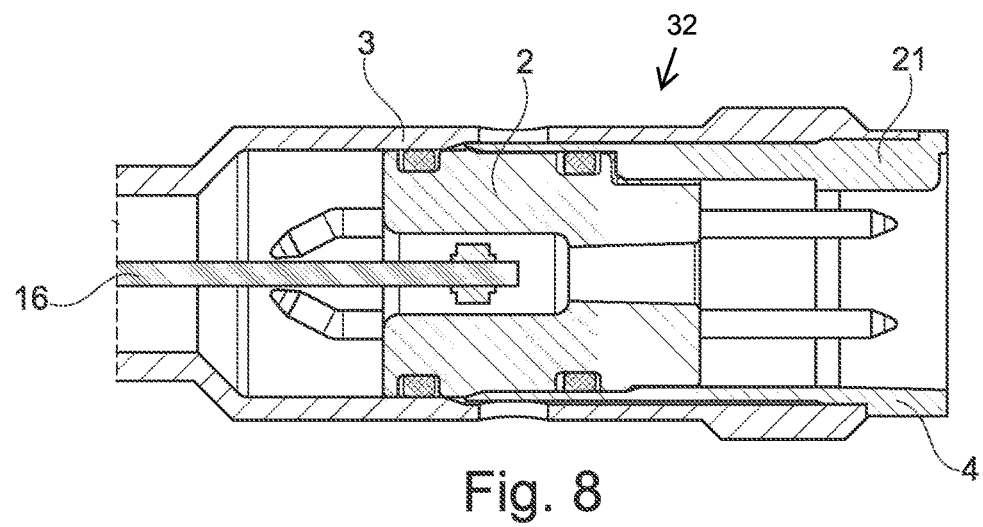

There are shown:

FIG. 1 an embodiment of the two-part plug-in module in accordance with the invention prior to installation;

FIG. 2 an embodiment of the installed plug-in module in accordance with the invention;

FIG. 3 an embodiment of a plug-in unit of the plug-in module in accordance with the invention in accordance with FIGS. 1 and 2;

FIG. 4 an embodiment of a coding sleeve of the plug-in module in accordance with the invention in accordance with FIGS. 1 and 2;

FIG. 5 an embodiment of a sleeve-like housing of the plug-in module in accordance with the invention in accordance with FIGS. 1 and 2;

FIG. 6 an embodiment of the plug-in module in accordance with the invention with a first construction size of the sensor;

FIG. 7 an embodiment of the plug-in module in accordance with the invention with a second construction size of the sensor; and FIG. 8 an embodiment of the plug-in module in accordance with the invention with a third construction size of the sensor.

FIG. 1 shows an embodiment of a plug-in module 1 in accordance with the invention which is preferably used for an inductive proximity switch or sensor 32. The plug-in module 1 is formed in two parts prior to its installation and comprises a plug-in unit 2 which is fastened in a sleeve-like housing 3. A coding sleeve 4 is present as the second part. The sleeve-like housing 3 should be understood in the following as a housing open at both ends and having a round cross-section.

The plug-in unit 2 comprises in accordance with FIG. 1 three outer diameters, wherein a smallest outer diameter 6 and a largest outer diameter 5 are shown and wherein a further outer diameter is shown therebetween. The sleeve-like housing 3 has at least two different inner diameters 7, 8. The plug-in unit 2 is positioned within the sleeve-like housing 3 such that the smallest inner diameter 8 of the sleeve-like housing 3 contacts the largest outer diameter 5 of the plug-in unit 2. The plug-in unit 2 has a sealing groove 9 at this position which is radially peripheral and in which a seal 10 is supported. The inner smallest inner diameter 8 of the sleeve-like housing 3 thus simultaneously forms a first sealing surface for the seal 10.

Starting from the largest outer diameter 5 of the plug-in unit 2, a smaller outer diameter 6 adjoins which faces the plug pins 11, 12 and adjoins a locally formed coding notch 13. A further sealing groove 14 which likewise runs radially around the plug-in unit 2 and in which a second seal 15 is placed is positioned in front of the coding notch 13.

A circuit board 16 whose one end is fixedly connected to the plug-in unit 2 projects into the plug-in unit 2. A respective LED 17, 18 is arranged at both sides of the circuit board 16. These LEDs 17, 18 transmit their light through at least one LED opening 19, 20 which is formed in the sleeve-like housing 3 and which is positioned between the two seals 10, 15. The electrical connection of the plug pins 11, 12 to the circuit board 16 takes place on the opposite side of the plug-in unit 2.

The coding sleeve 4 in accordance with FIG. 1 and FIG. 4 is also a cylindrical component in whose interior a coding element 21 axially extends locally, starting from the end of the coding sleeve 4. In this respect, the coding element 21 is formed in a stepped manner in its axial direction and in the present case, for example, has two steps 22 and 23, with a section 24 facing the plug-in unit 2 having the thinnest wall. The coding sleeve has different wall thicknesses, as shown in FIG. 4. The coding sleeve furthermore has a press fit 33 and a sealing fit 34. The sealing fit is arranged at the section 24. The press fit 34 is arranged at the thickest wall, in front of the collar 25. A collar 25 which forms a sealing surface for a mating plug, not shown further, outwardly adjoins the thickest wall. A coding rib 26 which radially inwardly adjoins the collar 25 and which is integrated in the step 26 serves for the unambiguous alignment of the mating plug. The second step 23 of the coding element 21 is used for aligning the coding sleeve 4 with respect to the plug-in unit 2.

As can be seen from FIG. 2 in which the plug-in module 1 is shown in a fully installed state, a sensor element 27 is seated at the free end of the circuit board 16, with the sleeve-like housing 3 being terminated by a front cap 28. In this respect, the second step 23 of the coding element 21 engages into the coding notch 13 of the plug-in unit 2 in the installed state. The section 24 with the thinnest wall is fixed between the sleeve-like housing 3 and the seal 15, with this section 24 simultaneously forming the sealing surface or the sealing seat for the seal 15. At the same time, the section 24 terminates the LED opening 20 from the inside so that hollow spaces are reduced. The coding sleeve 4 and the sleeve-like housing 3 are pressed together at the press fit 33 of the coding sleeve 4 in order advantageously to take up a torque from the mating plug to be introduced and not further shown. A further shape-matching element 29 of the coding sleeve 4 engages into a cut-out 30 of the sleeve-like housing 3, which likewise serves to take up a torque from the mating plug.

The circuit board 16 and the inner contour of the plug-in unit 2 are ideally designed such that only an aligned installation between the plug-in unit 2 and the circuit board 16 is possible so that a correct pin assignment is observed. The plug pins 11, 12 are pressed in the plug-in unit 2, wherein the bent plug pins 11, 12 are soldered to the circuit board 16 on the inner side of the sensor 27. An axial passage bore 31 is formed centrally in the plug-in unit 2; it is advantageously positioned between the plug pins 11, 12 and a compound can be introduced into the plug-in module 1 through it, whereby the sensor element 27 and the circuit board 16 carrying the electronic components are stabilized in their positions.

The seals 10, 15 used can be also be designed as shaped seals or as 2K seals instead of O rings or can be formed from the plug material itself by correspondingly shaped sealing ribs. The plug-in unit 2 having the plug pins 11, 12 can in this respect be manufactured by overmolding, by adhesion or by another connection technique.

The plug-in unit 2 is again shown in perspective in FIG. 3, with the sealing grooves 9, 14 having the two seals 10, 15 in particular projecting and the curved position of the plug pins 11, 12 for soldering to the circuit board 16 being shown. As can be seen from FIG. 4, the coding sleeve 4 is a cylindrical component which has an increasing wall thickness to the outside. In this respect, the coding element 21 becomes particularly clear which extends axially within the coding sleeve 4. The sleeve-like housing 3 shown in FIG. 2 again illustrates the two different inner diameters 7, 8 of this housing 3, with the LED bores 19, 20 being formed at the smallest inner diameter 8. FIG. 4 shows the shape-matching element 29. The shape-matching element 29 for fixing the coding sleeve 4 at the sleeve-like housing 3 engages into the cut-out 30 in accordance with FIG. 5.

On the installation of the plug-in module 1, the sensor element 27 is first assembled with the circuit board 16 carrying the electrical circuit and the plug-in unit 2 so that it forms a pre-assembly which is introduced into the sleeve-like housing 3 either from the one side or from the other side. The direction of introduction depends in this respect on the size of the sensor element 27. The plug-in module 1 is suitable for all sizes of the sensors 32 standard in automation technology, in particular M8, M12, M18 and M30.

It is assumed in the further observation that the sleeve-like housing has a size M12. In FIGS. 6-8, the plug-in module 1 in accordance with the invention is shown in relationship with different construction sizes of the sensors 32, In FIG. 6, the sensor 32 has a size M18 or M30, with the prefabricated pre-assembly comprising the sensor element being introduced into the sleeve-like housing 3 from the left hand side. This introduction takes place for so long until the smallest inner diameter 8 of the sleeve-like housing 3 comes into contact with the largest outer diameter 5 of the plug-in unit 2 which carries the first seal 10. The coding sleeve 4 is subsequently pushed between the plug-in unit 2 and the sleeve-like housing 3 in the described manner.

The sensor 32 has a size M12 in FIG. 7. As shown in FIG. 7, the pre-assembly comprising the sensor element is introduced into the sleeve-like housing 3 from the left or from the right. The introduction of the prefabricated pre-assembly also takes place here up to the positioning of the smallest inner diameter 8 of the housing 3 at the largest outer diameter 5 of the plug-in unit 2.

If a sensor 32 having the size M8 is used, as shown in FIG. 8, the pre-assembly can be introduced into the sleeve-like housing 3 from the right hand side until the largest outer diameter 5 of the plug-in unit 2 contacts the smallest inner diameter 8 of the sleeve-like housing 3.

Due to the described embodiments of the plug-in module 1, a respective one-part sleeve-like housing can be used for different construction sizes of the sensor elements. An installation of the plug-in unit 2 into the sleeve-like housing 3 from both directions is possible without damaging the seals 10, 15. At the same time, a clear alignment of the circuit board, pin assignment and plug coding takes place.

REFERENCE NUMERALS 1 plug-in module
2 plug-in unit
3 sleeve-like housing
4 coding sleeve
5 outer diameter
6 outer diameter
7 inner diameter
8 inner diameter
9 sealing groove
10 seal
11 plug pin
12 plug pin
13 coding notch
14 sealing groove
15 seal
16 circuit board
17 LED
18 LED
19 LED opening 20 LED opening
21 coding element
22 step
23 step
24 section
25 collar
26 coding rib
27 sensor element
28 front cap
29 shape-matching element
30 cut-out
31 passage bore
32 sensor
33 press fit
34 sealing fit

The invention claimed is:

1. A sensor with a plug-in module, the sensor being selected from the group consisting of an inductive proximity switch and an inductive proximity sensor, the sensor comprising: a sleeve-like housing; a sensor element positioned within the sleeve-like housing; a carrier board carrying an electronic circuit positioned within the sleeve-like housing; and a plug-in module comprising: a plug-in unit positioned within the sleeve-like housing; and a coding sleeve inserted between the plug-in unit and the sleeve-like housing, wherein the coding sleeve has a local coding element, with the coding sleeve completely surrounding the plug-in unit and being surrounded by the sleeve-like housing, the local coding element being formed in axially stepped form, with the steps tapering to decrease in thickness in a direction toward the plug-in unit, wherein the plug-in unit has at least two portions having different outer diameters; wherein the sleeve-like housing has at least two portions having different inner diameters, one of the at least two portions of the plug-in unit having a largest outer diameter associated therewith contacting one of the at least two portions of the sleeve-like housing having a smallest inner diameter associated therewith to form a sealing surface, wherein the sleeve-like housing and the coding sleeve and/or the coding sleeve and the plug-in unit are connected to one another in a shape-matched manner at least tangentially with respect to a circumferential direction.

2. The sensor with a plug-in module in accordance with claim 1, wherein the sleeve-like housing and the coding sleeve and/or the coding sleeve and the plug-in unit are connected to one another in a force-transmitting or shape-matching manner.

3. The sensor with a plug-in module in accordance with claim 1, wherein the one of the at least two portions of the sleeve-like housing having the smallest inner diameter associated therewith forms the sealing surface which contacts a first seal arranged at the plug-in unit.

4. The sensor with a plug-in module in accordance with claim 1, wherein two peripheral grooves for receiving a respective first and second seal are formed along an outer surface of the plug-in unit, wherein the second seal is arranged opposite the coding sleeve which forms a second sealing surface for the second seal.

5. The sensor with a plug-in module in accordance with claim 1, wherein the coding sleeve has an integrated coding rib for aligning a mating plug at its end opposite the plug-in unit.

6. The sensor with a plug-in module in accordance with claim 1, wherein the plug-in unit has a locally formed coding notch at at least an outer surface thereof.

7. The sensor with a plug-in module in accordance with claim 6, wherein one of the at least two portions of the plug-in unit has a smallest outer diameter associated therewith, and wherein the locally formed coding notch is formed at the one of the at least two portions of the plug-in unit having the smallest outer diameter associated therewith.

8. The sensor with a plug-in module in accordance with claim 1, wherein the sensor element, the carrier board carrying the electronic circuit and the plug-in unit form an electrically and mechanically fixedly connected pre-assembly, wherein the carrier board comprises a circuit board.

9. The sensor with a plug-in module in accordance with claim 1, wherein a section of the coding sleeve covers an LED bore from the inside, with the LED bore being formed in the sleeve-like housing.

10. The sensor with a plug-in module in accordance with claim 9, wherein the LED bore is arranged between two seals surrounding the plug-in unit.

11. The sensor with a plug-in module in accordance with claim 10, wherein the two seals surrounding the plug-in unit are positioned at one side of the LED bore, with the side facing the sensor element.

12. The sensor with a plug-in module in accordance with claim 1, wherein the plug-in unit has an axial passage bore for filling with a compound.

* * * * *